(12) United States Patent
Kitade et al.

(10) Patent No.: US 6,507,574 B1
(45) Date of Patent: *Jan. 14, 2003

(54) TRANSMISSION/RECEPTION APPARATUS AND TRANSMIT POWER CONTROL METHOD

(75) Inventors: Takashi Kitade, Yokosuka (JP); Kazuyuki Miya, Kawasaki (JP); Katsuhiko Hiramatsu, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/645,522

(22) Filed: Aug. 25, 2000

Related U.S. Application Data

(63) Continuation of application No. 09/396,375, filed on Sep. 15, 1999.

(30) Foreign Application Priority Data

Sep. 17, 1998 (JP) .......................................... 10-263416

(51) Int. Cl.[7] ................................................ H04J 13/02
(52) U.S. Cl. ...................................... 370/335; 455/522
(58) Field of Search ................................. 370/320, 335, 370/342, 441, 479, 318; 375/142, 143, 144, 148, 150, 152, 227, 267, 347, 130; 455/522, 69, 88, 273, 562

(56) References Cited

U.S. PATENT DOCUMENTS

| | | | | |
|---|---|---|---|---|
| 5,652,748 A | * | 7/1997 | Jolma et al. | 370/320 |
| 5,652,764 A | * | 7/1997 | Kanzaki et al. | 375/200 |
| 5,786,791 A | * | 7/1998 | Bruckert | 342/457 |
| 5,872,775 A | * | 2/1999 | Saints et al. | 370/342 |
| 5,873,028 A | * | 2/1999 | Nakano et al. | 455/69 |
| 5,881,057 A | * | 3/1999 | Komatsu | 370/335 |
| 5,886,987 A | * | 3/1999 | Yoshida et al. | 370/318 |
| 5,970,084 A | * | 10/1999 | Honda | 375/200 |
| 6,070,086 A | * | 5/2000 | Dobrica | 455/522 |
| 6,097,972 A | * | 8/2000 | Saints et al. | 455/572 |
| 6,212,364 B1 | * | 4/2001 | Park | 455/69 |
| 6,289,009 B1 | * | 9/2001 | Sato | 370/342 |

FOREIGN PATENT DOCUMENTS

| | | |
|---|---|---|
| EP | 0755127 | 1/1997 |
| EP | 0844743 A2 | 5/1998 |
| JP | 0870274 | 3/1996 |
| JP | 870274 | 3/1996 |
| JP | 09102768 | 4/1997 |
| JP | 09238098 | 9/1997 |
| JP | 10098431 | 4/1998 |
| WO | 9827669 | 6/1998 |

* cited by examiner

*Primary Examiner*—Kenneth Vanderpuye
(74) *Attorney, Agent, or Firm*—Stevens, Davis, Miller & Mosher, LLP

(57) ABSTRACT

Spreading sections 104 and 105 of the base station spread the respective distributed data using mutually orthogonal spreading codes and they are transmitted from antennas 106 and 107. Despreading sections 202 and 203 of the mobile station despread the received signals using the same spreading codes as those used at the base station, demodulation sections 204 and 205 demodulate the despread signals, received signal power measuring sections 207 and 208 measure their received signal powers from the demodulation result, received signal power measuring section 209 combines the measured received signal powers and transmit power control section 212 controls transmission power based on the combined received signal power. When carrying out diversity reception through a plurality of antennas at the base station, this suppresses transmit power control errors to a small level at the mobile station.

4 Claims, 4 Drawing Sheets

TRANSMISSION/RECEPTION APPARATUS AND TRANSMIT POWER CONTROL METHOD

This application is a continuation of U.S. patent application Ser. No. 09/396,375, filed Sep. 15, 1999.

BACKGROUND OF THE INVENTION

1. Field of the Invention

The present invention relates to a CDMA/TDD-based transmission/reception apparatus carrying out open-loop transmit power control and its transmit power control method.

2. Description of the Related Art

A CDMA (Code Division Multiple Access) system is one of multiple access systems by which a plurality of stations in a radio transmission system such as car telephones and cellular telephones carry out communications on a same frequency band simultaneously and transmits information signals with their spectrum spread over a band wide enough compared to the original bandwidth, having the features of achieving highly efficient use of frequencies and accommodating many users.

However, it has a near-far problem when each mobile station transmits a signal by the same power on the CDMA system and a desired transmission station is far and a non-desired transmission station (interference station) is near. The near-far problem is the reception power of a signal transmitted from the interference station becomes greater than the reception power of a signal transmitted from the desired transmission station, failing to suppress mutual correlation between spreading codes with a processing gain alone, which leads to make communications impossible.

Therefore, a cellular system using the CDMA system requires transmit power control according to the conditions of each channel on the uplink. It also requires transmit power control for compensating against instantaneous fluctuations of received signal power as fading which is a cause of deterioration of the line quality in terrestrial mobile communication.

Here, there are cases where a TDD (Time Division Duplex) is used as a duplex system for this multiple access communication system. The TDD system is a system carrying out communications by time-sharing a same radio frequency for transmission and reception, and since it uses a same frequency band for transmission and reception its frequency correlation of fading fluctuations between a transmission signal and reception signal is 1.

Furthermore, if the period of switching between transmission and reception is short enough, time correlation in the condition of the channel of mutual fading fluctuations, etc. is high, and therefore mobile stations can perform open-loop transmit power control that controls transmission power based on received signal power effectively.

If the base station has a plurality of antennas, there are cases where transmission diversity is used which selects the most suitable transmission antenna based on received signal power of those antennas. Using transmission diversity eliminates the necessity of space diversity at mobile stations making it possible to reduce the size of those mobile stations.

The following is an explanation of a base station and mobile station of a CDMA/TDD-based radio transmission system which carries out conventional open-loop transmit power control and uses transmission diversity, using the attached drawings.

FIG. 1 is a block diagram showing a configuration of a conventional base station. The base station apparatus shown in FIG. 1 comprises modulation section 11 that modulates transmission data, spreading section 12 that multiplies the modulated signal by spreading code A and spreads it, antenna control section 13 that switches transmission antennas, antennas 14 and 15 that transmit/receive signals, despreading section 16 that multiplies the received signal by spreading code B and despreads it, demodulation section 17 that demodulates the despread signal and antenna selection section 18 that measures the level of the received signal from the demodulation result and selects a transmission antenna.

The transmission data are modulated by modulation section 11 and spread with spreading code A by spreading section 12. Then, the spread signal is transmitted from either antenna 14 or antenna 15 controlled by transmission antenna control section 13.

The signal received by antenna 14 and antenna 15 is despread by despreading section 16 with spreading code B. The despread signal is demodulated by demodulation section 17 with received data extracted and the demodulation result input to transmission antenna selection section 18 as the antenna selection information. Then, transmission antenna selection section 18 compares the levels of the received signals at the two antennas based on the demodulation result and the antenna that received the larger level is selected as the antenna for transmitting data in the next slot and the signal showing the selection result is output to transmission antenna control section 13.

FIG. 2 is a block diagram showing a configuration of a conventional mobile station. The mobile station shown in FIG. 2 comprises antenna 21 that transmits/receives signals, despreading section 22 that multiplies the received signal by spreading code A and despreads it, demodulation section 23 that demodulates the despread signal, received signal power measuring section 24 that measures the level of the received signal from the demodulation result, modulation section 25 that modulates transmission data, spreading section 26 that multiplies the modulated signal by spreading code B and spreads it and transmit power control section 27 that performs transmit power control based on received signal power.

The signal received by antenna 21 is despread by despreading section 22 with spreading code A, demodulated by demodulation section 23 with the received data extracted and the demodulation result input to received signal power measuring section 24. Received signal power measuring section 24 measures received signal power from the demodulation result and the measurement result is input to transmit power control section 27. Transmit power control section 27 calculates a transmission power value from the transmission power value of the base station, target received signal power value at the base station and measurement result.

The transmission data are modulated by modulation section 25, spread by spreading section 26 with spreading code B, and with power amplified by transmit power control section 27 based on the calculated transmission power value, transmitted from antenna 21.

Thus, in the conventional radio transmission system the base station transmits signals by selecting one antenna from a plurality of antennas and the mobile station carries out open-loop transmit power control based on received signal power.

However, in the conventional radio transmission system above, the mobile station carries out transmit power control only targeted at the antenna through which the base station transmitted signals and if signals are received by a plurality of antennas at the base station, transmission power is not controlled for the antennas that did not transmit signals and transmission power is not enough controlled for all of reception antennas, causing a problem of causing transmit power control errors.

SUMMARY OF THE INVENTION

It is an objective of the present invention to reduce transmit power control errors to a small level when the base station performs reception through a plurality of antennas.

The present invention achieves the objective above by the base station spreading the transmission data distributed by the number of transmission antennas with mutually different spreading codes, then transmitting them in parallel from a plurality of transmission antennas, and by the mobile station despreading the each of received signals transmitted the plurality of transmission antennas, measuring and combining received signal power and controlling transmission power based on the combined received signal power.

BRIEF DESCRIPTION OF THE DRAWINGS

The above and other objects and features of the invention will appear more fully hereinafter from a consideration of the following description taken in connection with the accompanying drawing wherein one example, is illustrated by way of example, in which.

DETAILED DESCRIPTION OF THE PREFERRED EMBODIMENTS

With reference now to the attached drawings, an embodiment of the present invention is explained in detail below.

Figure 1:
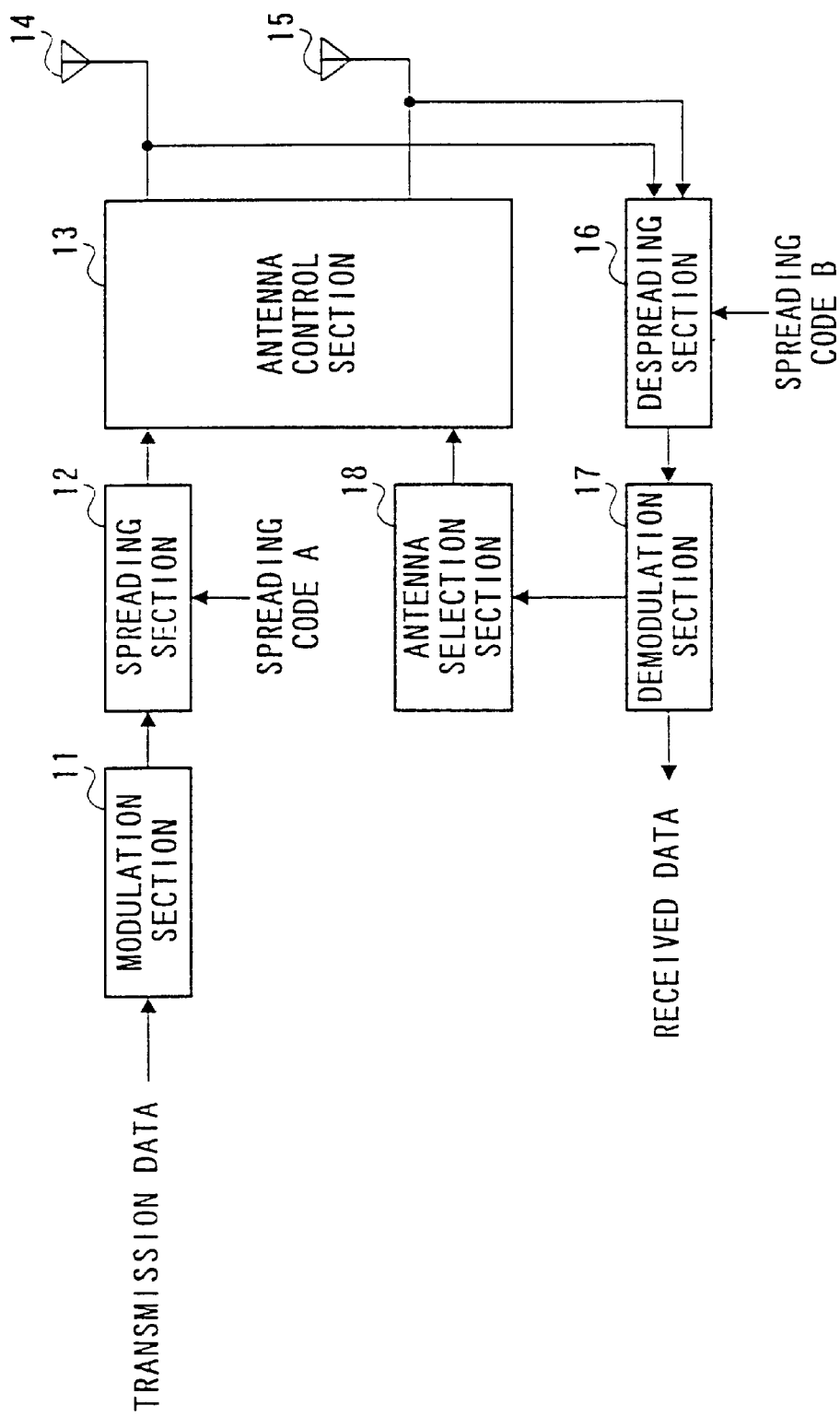
FIG. 1 is a block diagram showing a configuration of a conventional base station.
Figure 2:
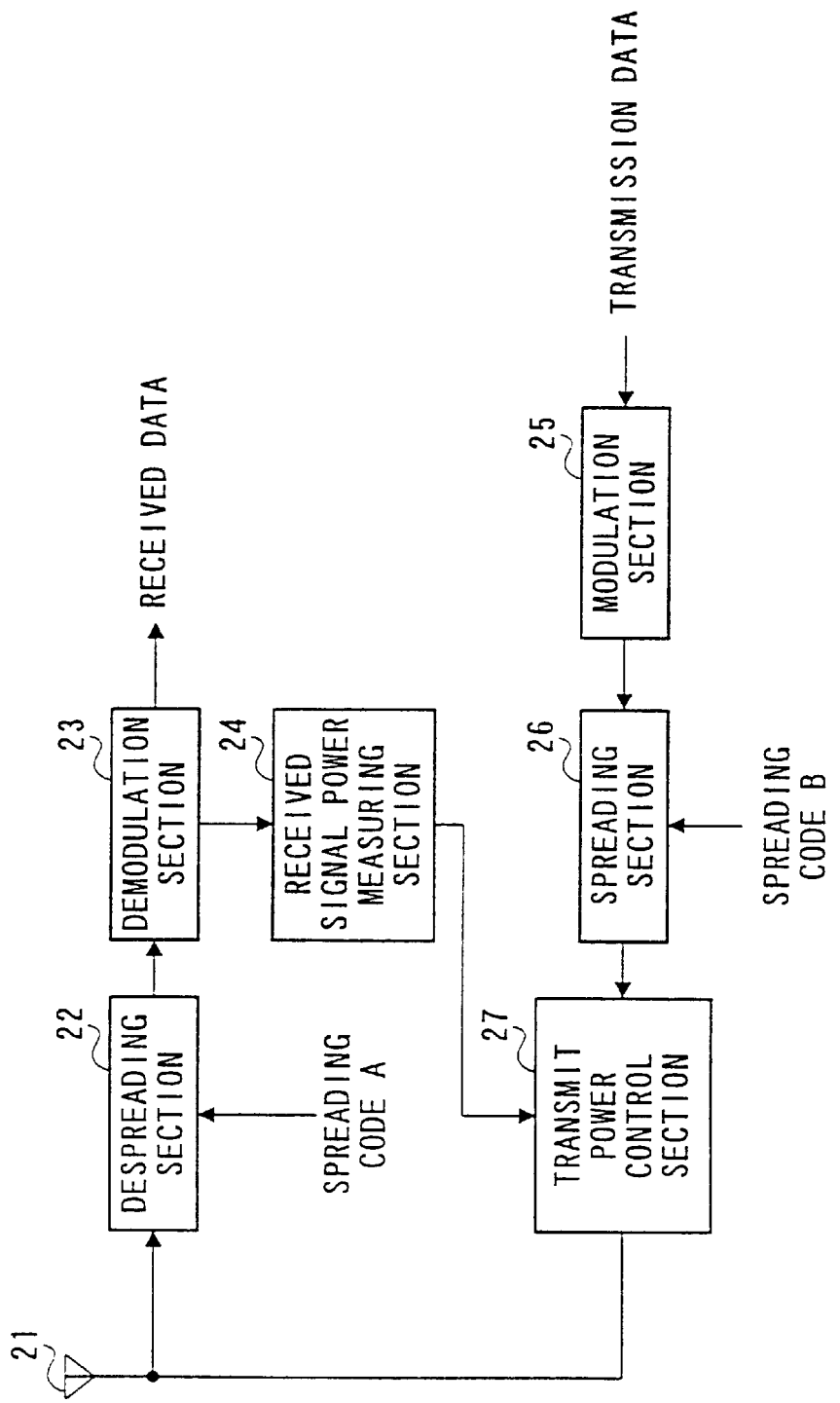
FIG. 2 is a block diagram showing a configuration of a conventional mobile station.
Figure 3:
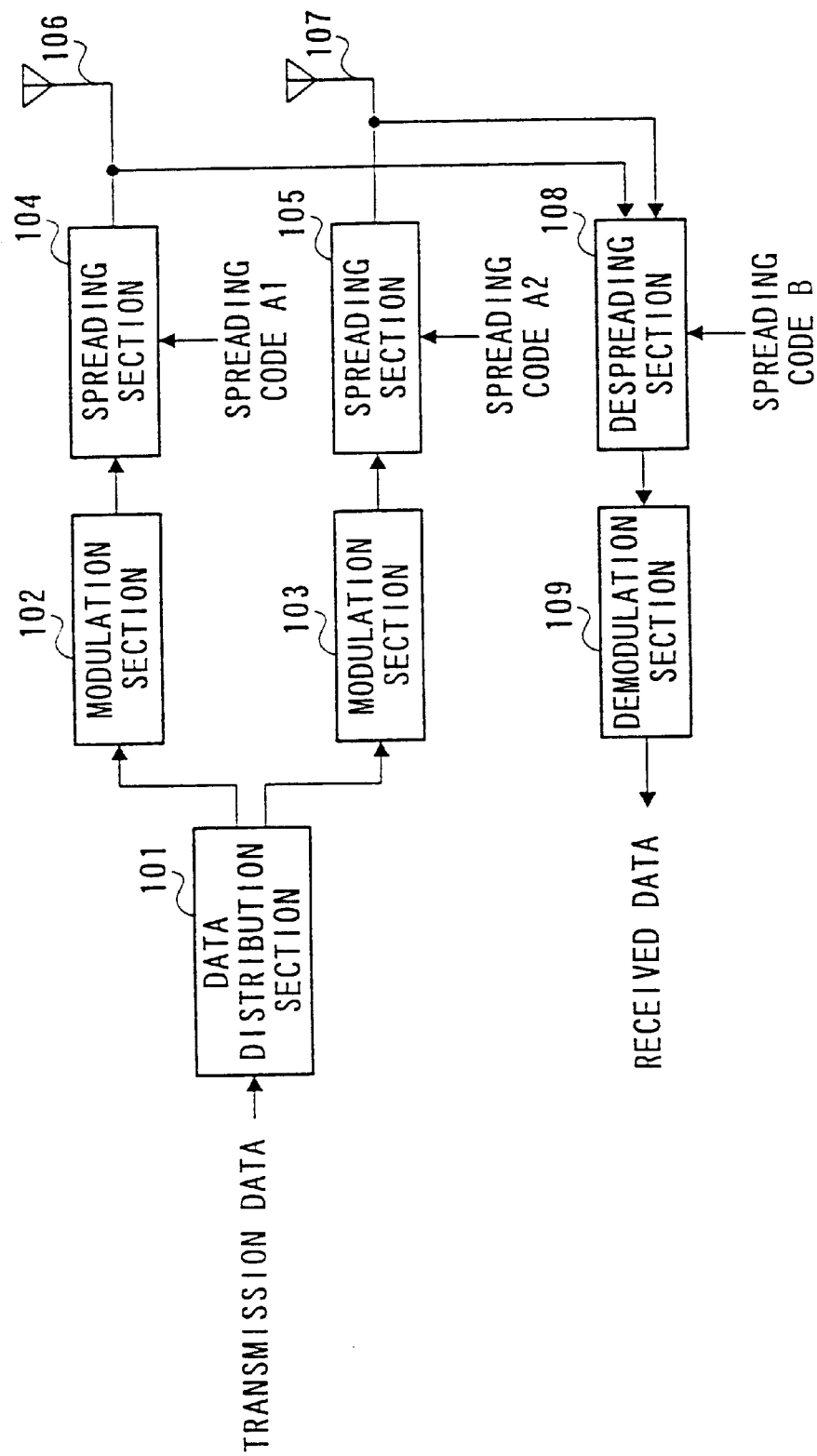
FIG. 3 is a block diagram showing a configuration of a base station according to an embodiment of the present invention.

FIG. 3 is a block diagram showing a configuration of a base station in an embodiment of the present invention. In the base station in FIG. 3, data distribution section 101 distributes transmission data by the number of antennas. Data are distributed in various ways; such as distributing data by serial/parallel conversion and simply distributing data in such a way that same data are transmitted from respective antennas.

Modulation sections 102 and 103 modulate the distributed transmission data, spreading section 104 multiplies the modulated signal by spreading signal A1 and spreads it and spreading section 105 multiplies the modulated signal by spreading signal A2 and spreads it. Antennas 106 and 107 transmit the spread signals by radio and receive signals transmitted from a mobile station. Despreading section 108 multiplies the received signal by spreading code B and despreads it and demodulation section 109 demodulates the despread signal and extracts the received data.

Then, the flow of signals transmitted/received by the base station is explained. Transmission data are distributed into portions corresponding in number with a plurality of antennas by data distribution section 101, modulated by modulation sections 102 and 103 and input to spreading sections 104 and 105.

Then, distributed data are spread into mutually different types of spreading codes by spreading sections 104 and 105. At this time, it is desirable that these types of spreading codes be orthogonal to one another as much as possible. These spread signals are transmitted in parallel from antenna 106 and 107.

The signals received by antennas 106 and 107 are despread by despreading section 108 with spreading code B. The despread signals are demodulated with received data extracted by demodulation section 109.

Figure 4:
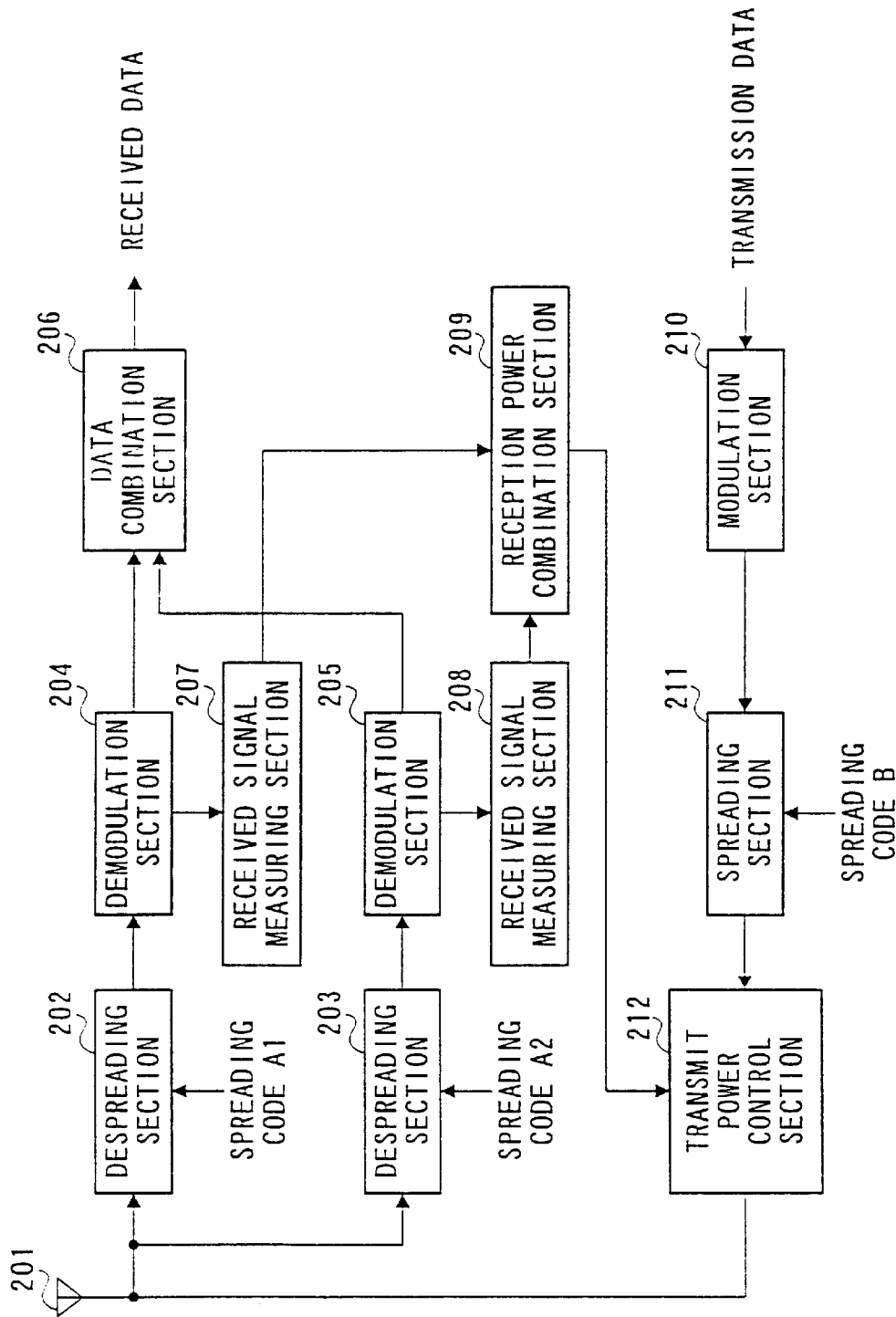
FIG. 4 is a block diagram showing a configuration of a mobile station according to the embodiment above.

Then, the configuration of the mobile station in the embodiment above is explained using a block diagram shown in FIG. 4. In the mobile station in FIG. 4, antenna 201 transmits signals and receives signals transmitted from base station. Despreading sections 202 and 203 despread received signals by multiplying them by same spreading codes A1 and A2 as those used on the transmitting side. Demodulation section 204 demodulates the signal despread with spreading code A1 and demodulation section 205 demodulates the signal despread with spreading code A2, and data combination section 206 returns the demodulated data to the data form prior to the distribution.

Received signal power measuring section 207 measures received signal power from the demodulation result of demodulation section 204 and received signal power measuring section 208 measures received signal power from the demodulation result of demodulation section 205. Received signal power calculation section 207 combines-received signal powers of the signals transmitted in parallel. There are various ways of combining received signal powers such as simply adding them up or adding them up after weighting received signal powers. Further, there is another way of comparing levels of received signals to determine a higher level as a received signal level. Adding up received signal powers of data after weighting them allows transmission power to be controlled more accurately than using received signal powers simply added up.

Modulation section 210 modulates transmission data and spreading section 211 multiplies the modulated signal by spreading code B and spreads it. Transmit power control section 212 calculates a transmission power value from the combined received signal power and amplifies it to a transmission power value, which is the power of the transmission signal calculated.

Then, the flow of signals transmitted/received by the mobile station shown in FIG. 4 is explained. A signal received by antenna 201 is despread by despreading section 202 with spreading code A1 and despread by despreading section 203 with spreading code A2. The signal despread with spreading code A1 is demodulated by demodulation section 204 with the demodulation result input to received signal power measuring section 207, and the signal despread with spreading code A2 is demodulated by demodulation section 205 with the demodulation result input to received signal power measuring section 208. The demodulated signals are combined by data combination section 206 into received data.

Received signal power measuring section 207 measures received signal power from the demodulation result of demodulation section 204 and received signal power measuring section 208 measures received signal power from the demodulation result of demodulation section 205 and the measuring result of each of received signal powers is input to received signal power combination section 207.

Then, received signal power calculation section 209 combines the received signal power values and the combined received signal power value is input to transmit power control section 212. Transmit power control section 212 calculates a transmission power value from the transmission power value of the base station, target received signal power value at the base station and the combined received signal power value.

The transmission data are modulated by modulation section 210, spread by spreading section 211 with spreading code B, power amplified by transmit power control section 212 based on the transmission power value calculated and transmitted from antenna 201.

Thus, it can be measured that the received signal power of signals transmitted the each antenna of the base station by transmitting signals spread using mutually orthogonal spreading codes on the base station side and combining received powers of signals despread with spreading codes on the mobile station side. And open-loop transmit power control can be targeted on all reception antennas by calculating transmission power according to the received signal power on the mobile station side.

As explained above, the present invention allows the mobile station to perform open-loop transmit power control targeted on all antennas of the base station, making it possible to suppress transmit power control errors to a small level during reception at the plurality of antennas of the base station and reduce the total transmission power value of the mobile station.

The present invention is not limited to the above described embodiments, and various variations and modifications may be possible without departing from the scope of the present invention.

This application is based on the Japanese Patent Application No. HEI 10-263416 filed on Sep. 17, 1998, entire content of which is expressly incorporated by reference herein.

What is claimed is:

1. A communication terminal apparatus that receives transmit signals which are spread with a plurality of different spreading code sequence and which are transmitted in parallel from different antennas respectively, said communication terminal apparatus comprising:

a plurality of receiver circuits, each having a despreading section, that receive the transmit signals and despread the transmit signals with the different spreading code sequences respectively to obtain a plurality of received signals;

data combination circuitry that combines the received signals obtained in the plurality of receiver circuits to obtain combined received data;

measurement circuitry that measures received power of said plurality of received signals in the receiver circuits;

combination circuitry that combines measured received power of the plurality of received signals of said measurement circuitry to obtain combined received power; and transmit power control circuitry that performs open-loop transmit power control using the combined received power.

2. A communication terminal apparatus that receives a plurality of signals which are obtained by spreading data allocated corresponding to respective ones of a plurality of antennas with a spreading code sequence different from one another and which are transmitted in parallel from different antennas of said plurality of antennas, said communication terminal apparatus comprising:

measurement circuitry that measures received power of said plurality of signals received by the communication terminal apparatus;

combination circuitry that combines measured received power of the plurality of signals of said measurement circuitry to obtain combined received power; and transmit power control circuitry that performs open-loop transmit power control using the combined received power.

3. A radio communication method in a communication terminal apparatus that receives transmit signals which are spread with a plurality of different spreading code sequences and which are transmitted in parallel from different antennas respectively, said method comprising the steps of:

(a) receiving the transmit signals and despreading the transmit signals with the different spreading code sequences respectively to obtain a plurality of received signals;

(b) combining the plurality of received signals obtained in step (a) to obtain combined received data;

(c) measuring received power of the plurality of received signals obtained in step (a);

(d) combining said received power of the plurality of received power measured in step (c) to obtain combined received power; and (e) performing open-loop transmit power control using the combined received power obtained in step (d).

4. A radio communication method in a communication terminal apparatus that receives a plurality of signals which are obtained by spreading data-allocated-corresponding to respective ones of a plurality of antennas with a spreading code sequence different from one another and which are transmitted in parallel from different antennas of a plurality of antennas, said method comprising the steps of:

(a) measuring received power of said plurality of signals received by the communication terminal apparatus;

(b) combining measured received power of the plurality of signals obtained in step (a) to obtain combined received power; and (c) performing open-loop transmit power control using the combined received power.

* * * * *